US011893369B2

(12) United States Patent
Finnigan et al.

(10) Patent No.: US 11,893,369 B2
(45) Date of Patent: Feb. 6, 2024

(54) DETERMINING A DISTRIBUTED SYSTEM TOPOLOGY FROM A SINGLE APPLICATION DEPLOYMENT

(71) Applicant: RED HAT, INC., Raleigh, NC (US)

(72) Inventors: Kenneth Finnigan, Boston, MA (US); Paul Robinson, Newcastle (GB)

(73) Assignee: Red Hat, Inc., Raleigh, NC (US)

( * ) Notice: Subject to any disclaimer, the term of this patent is extended or adjusted under 35 U.S.C. 154(b) by 78 days.

(21) Appl. No.: 17/581,003

(22) Filed: Jan. 21, 2022

(65) Prior Publication Data
US 2023/0236810 A1    Jul. 27, 2023

(51) Int. Cl.
| | |
|---|---|
| *G06Q 10/06* | (2023.01) |
| *G06F 9/445* | (2018.01) |
| *G06F 9/455* | (2018.01) |
| *G06F 8/41* | (2018.01) |
| *G06F 8/75* | (2018.01) |
| *G06F 8/60* | (2018.01) |

(52) U.S. Cl.
CPC .............. *G06F 8/433* (2013.01); *G06F 8/60* (2013.01); *G06F 8/75* (2013.01)

(58) Field of Classification Search
CPC .......... G06F 11/3612; G06F 8/61; G06F 8/60; G06F 11/3664; G06F 11/3684; G06F 11/3688; G06F 8/433; G06F 8/75
See application file for complete search history.

(56) References Cited

U.S. PATENT DOCUMENTS

| | | | |
|---|---|---|---|
| 10,178,045 B2 | 1/2019 | Kumar | |
| 10,547,682 B2 | 1/2020 | Suter et al. | |
| 11,216,261 B1 * | 1/2022 | Moyal | G06F 9/455 |
| 2021/0232390 A1 | 7/2021 | Hwang et al. | |
| 2021/0294601 A1 | 9/2021 | Vs et al. | |

OTHER PUBLICATIONS

Raj et al., "Microservices—A perfect SOA based solution for Enterprise Applications compared to Web Services", Department of Computer Science and Engineering National Institute of Technology, Warangal, India, May 18-18, 2018, 7 pages, https://www.researchgate.net/publication/339554188.

Dehghani, "How to Break a Monolith into Microservices", Principal Technology Consultant at Thoughtworks, Apr. 24, 2018, 20 pages, https://martinfowler.com/articles/break-monolith-into-microservices.html.

Frye, "8 Steps for Migrating Existing Applications to Microservices", Sep. 28, 2020, 9 pages, https://insights.sei.cmu.edu/blog/8-steps-for-migrating-existing-applications-to-microservices/.

Deshpande et al., "Challenges and Patterns for Modernizing a Monolithic Application into Microservices", IBM, Jun. 19, 2020, 22 pages, https://developer.ibm.com/articles/challenges-and-patterns-for-modernizing-a-monolithic-application-into-microservices/.

* cited by examiner

*Primary Examiner* — Thuy Dao
(74) *Attorney, Agent, or Firm* — Lowenstein Sandler LLP (57) ABSTRACT

Systems and methods for determining a topology of an application deployment on a distributed system can include receiving multiple traces of requests within an application, where the application includes multiple components. They can also include determining a number of times that each span between the components is traversed by a trace and associating each span with a corresponding weight reflecting the number of times that the span is traversed. Such systems and methods can further include selecting a deployment scenario based on the respective weights of each of the spans.

20 Claims, 6 Drawing Sheets

DETERMINING A DISTRIBUTED SYSTEM TOPOLOGY FROM A SINGLE APPLICATION DEPLOYMENT

TECHNICAL FIELD

The disclosure is generally related to computer systems, and more particularly, to determining system topology of microservice-based application deployments.

BACKGROUND

Microservices are autonomous executable code services that can work together to form an application. They can be pieces of software instruction code, which compute responses for client requests. For example, if a client sends a request a microservice can respond to that request. Microservices may be deployed in a distributed system or "microservice system" in a clustering platform. Microservices can permit an application to be structured as a collection of loosely coupled components. Thus, the utilization of microservices can break down complex applications into small independent processes to produce highly-decoupled systems. The microservices may be executed in containers to create containerized applications. Containerization is an operating-system (OS)-level virtualization environment of a host machine that provides a way to isolate the microservice process. Accordingly, each microservice can be focused on doing a relatively simple task to support the application within each individual container. One primary benefit of microservices is that some types of applications can be more easily built and maintained by being broken down into smaller composable interoperable pieces. Each component can then be continuously developed and separately maintained to improve the application without having to disturb the entire application. This is in contrast to a traditional, monolithic application which is all developed, updated, and maintained all in one piece.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein are methods and systems for determining a distributed system topology of a microservice application system deployment. A microservice system topology can be a representation of communication paths between components of a microservice based application. A microservice-based application is a collection of microservices, which can be processes (e.g., instantiated from respective software modules) that evaluate and provide responses for client requests. For example, responsive to receiving a request from a client, a microservice can perform an evaluation (e.g., an operation) related to the request and send a response to that request from the client. The client itself can also be a microservice. Microservices may be deployed in a microservice system using a microservice clustering platform.

Microservices can interact and work together in a variety of ways within a microservice-based application. For example, if a user of an employee onboarding application wants to access an employer's system, they may need to verify their identity. Accordingly, the microservice that communicates with the employer company's employee database may need to communicate with a fraud prevention microservice, which itself may need to communicate with a user identity verification microservice. To provide better efficiency, this employer company might eventually build a microservice that gives users different options for identity verification. This new microservice may also need to communicate with one or more of the existing microservices. Modern applications may be broken down in this way, as a network of microservices each performing a specific function and capable of being independently developed and deployed.

Use of microservices allows for creation of highly-decoupled systems by breaking down complex applications into relatively simple independently deployable processes. A containerized computing services platform, such as a platform-as-a-service (PaaS) or a function-as-a-service (FaaS) system, may implement microservices. The microservices can be executed in containers to create containerized applications in a containerized computing services platform. Containerization is an operating-system (OS)-level virtualization environment of a host machine that provides a way to isolate the microservice process. Each microservice process can be focused on doing a relatively simple operation to enable the functionality of the application within each individual container.

Such applications can be developed in a containerized software development environment by multiple entities (e.g., different developers). A container may be an execution environment represented by an isolated virtualized userspace instance of an operating system, such that the userspace instance is associated with a kernel instance which may be shared with other containers. The containers may be employed to store the software application code and microservices (e.g., a utility program such as a compiler) for performing operations on the software code. A microservice may be an independently-deployable modular service that may communicate with other services in a system (e.g., a cloud-based system) through a lightweight interface. The code of the software application may be stored along with microservices in containers to create containerized applications. The containerized application may be released as a software product that can be executed by the PaaS or FaaS system as a self-contained application on computing nodes in a cloud (i.e., a distributed computing system having resources located at different locations). Each of the computing nodes (e.g., a host computer, a virtual machine, etc.) may support a container execution environment.

In some embodiments, an application may be deployed as a plurality of services (e.g., microservices) on one or more of the computing nodes. Each of the services may be hosted by one or more containers. More particularly, for example, multiple replicas of a service may be host by a plurality of containers running on one or more nodes. Each of the replicas may represent an instance of the service and may provide the same functionality of the service. In many situations it is beneficial to host and deploy each container and/or microservice independently of each other. This may entail deploying and hosting the microservice on different and separate sets of computing resources or in different physical/geographic locations. Being able to deploy microservices in disparate locations and on different resources can provide more efficient execution of the processes of each microservice independently and allow different microservices to be developed in different development environments while still remaining interoperable within a larger application. This leads to the need of determining a topology for the deployment of the microservices within a distributed computing system.

Some approaches to deploying and hosting applications and/or services may use various heuristics in order to determine how to break up an application topology into independently and jointly deployable components (e.g., microservices). For example, some approaches are based on reasoning about the business domain or intuiting the code components which should belong together without consideration of practical indicators of system efficiency. Applications divided and distributed according to these methods may result in inefficient microservice groupings being deployed together and microservices in frequent communication with one another being deployed independently. This, consequently, may lead to increased downtime and increased communication costs for running and maintaining the application of which the microservices are constituent components.

Aspects of the disclosure address the above-described and other deficiencies by providing systems and methods for determining an application system topology for constituent component (e.g., microservice) deployment. In accordance with one or more implementations of the present disclosure, an analysis of traces of requests across various components of an application can be used to determine how strongly coupled a particular pair of components is within the application. A trace can be a record of a path that a request follows through an application system. A trace is composed of one or more spans, where each span is a named timed operation together with the request that initiates the operation and the response generated after the operation which represent a part of the workflow of the application. Accordingly, tracing is technique used to analyze microservices within an application and to see which microservices communicate with each other (e.g., get called by other microservices) and under what parameters this occurs (e.g., determine which requests that got invoked under each service). The number of times the traces traverse each span between the constituent components of the application can be associated with a weight attributable to each respective span. In some implementations, the weights of each span can serve as a basis for selecting a deployment scenario having a particular application component topology. Consequently, the application components can be deployed according to the deployment scenario such that the components that are in frequent communication are merged and deployed jointly while components that communicate more infrequently are deployed independently.

In some implementations, the components of an application can be initially defined either as executable elements (e.g., microservices) within a monolithic application code or as interconnected composable executable elements within an application with distinct separate components, some of which may already be either jointly or separately deployed. In this context, composable systems and components are those that can be selected and assembled in various combinations to satisfy specific user requirements while maintaining the essential features of being self-contained (i.e., modular and able to be deployed independently and able to cooperate with other components) and stateless (i.e., treating each request as an independent transaction unrelated to any previous request). Traces can be requested and performed to track the path that requests take between the components of the application.

The performance of a trace, also referred to as tracing herein, can include collecting data as a request makes its way through an application. In one implementation, to make each trace identifiable across all the different components of an application, a unique ID can be assigned to each request and a unique ID can be assigned to each step in a trace, encoding contextual information. Further, the encoded context can be passed (i.e., propagated) from one service to the next as the request makes its way through the application environment. This allows the correlation of each step of a trace across the spans between application components, in the correct order, along with other necessary information to track the requests. The traces can be performed over a particular period of time during which the application is subject to typical use. In one implementation, traces of all possible requests within the application can be performed.

Thus, once the traces are performed, every span traversed by one or more of the traces can be given (i.e., assigned or associated with) a weight. The weight of a span can reflect the number of times the span is traversed by a trace. In some implementations, there may be a threshold criterion (e.g., a threshold value, a minimum weight that is pre-determined by a user or an application setting) with which the weights of each of the spans can be compared by a device in a distributed computing system as described in more detail below with reference to FIG. 1. The components between which the spans have weights that satisfy the threshold criterion (e.g., have weights that are greater than the threshold value) can, within a deployment scenario, be deployed jointly, while components between which the spans have weights that do not satisfy the threshold criterion (e.g., have weights that are less than the threshold value) can be deployed independently within the deployment scenario. As used herein, components being deployed jointly or together means that the components are hosted and executed on the same set of computing resources (e.g., a server, a virtual machine, a container, etc.) that may be located at one physical location (e.g., within the same data center, physical machine, etc.)

A deployment scenario can be chosen such that some or all of the application components having spans between them with weights that satisfy the threshold criterion are deployed together (i.e., at the same location or on the set of computing resources, such as on the same machine, computing node, container, etc.) while some or all of the components having spans between them with weights that do not satisfy the threshold criterion are deployed separately (i.e., at different locations or on different sets of computing resources, such as on the different machines, computing nodes, containers, etc.). Then, the application components can be deployed according to the selected deployment scenario.

In some implementations, a directed weighted graph can be constructed from the traces where each node of the graph would represent a starting or ending point of a span traversed by a trace. In one implementation, the weight assigned an edge between two nodes of the graph can be calculated as the proportion of the total number of traces that traversed the particular span between the two nodes (i.e., the sum of all the traces that traverse the span between the two nodes divided by the number of all traces performed). Accordingly, in this implementation, the maximum weight that can be given to a particular span will be a weight of 1 which will occur when all the traces of the application traverse the span. Analogously, in this implementation, the minimum weight that can be given to a particular span will be a weight of 0 which will occur when none of the traces of the application traverse the span.

In some implementations, the directed weighted graph can be traversed with a Depth First Search (DFS) to determine the number of times each span is traversed and, therefore, the proportion of traces that traverse each span. In DFS, each path that a trace takes is traversed starting from the root node (i.e., the component where the trace request originates) to the end node of each path of the possibility tree (i.e., a tree diagram of all the possible paths a request could take within the application). Thus, in some implementations, as a result of the performance of the traces, each edge connecting two nodes (e.g., representing application components) of the graph can be assigned a corresponding weight reflecting the weight of the corresponding span. These resulting weights, for each edge, can be compared against a threshold criterion. The threshold criterion can reflect a "merge factor" that determines whether components should or should not be merged. In some cases the components can be merged into a single deployment but separate from other components deployed as part of the application.

For example, the threshold criterion can be whether or not a value associated with a span exceeds a threshold value. For example, a threshold number value can be set such that components having spans between them with weights larger than the threshold value (i.e., predetermined merge factor) are identified for merging (e.g., for deploying together) while components having spans between them with weights smaller than the threshold value are recommended to be deployed separately. The recommendations can take the form of deployment scenarios of suggested application component deployment groupings indicating which components should be deployed together (i.e., jointly in one location or on one set of computing resources) and which components should be deployed separately (i.e., independently at different location or on different sets of computing resources).

A deployment scenario can be a visual representation of a directed graph of application components showing one or more of the components being merged or positioned close together within the representation (i.e., to indicate that these components should be deployed together) and having one or more components being split off or distanced away from one or more of the other components (i.e., to indicate that these components should be deployed separately). As explained in more detail with reference to FIG. 1 such visualizations can be generated by a computing device of a distributed computing system and shown to a user. For each application and corresponding weighted directed graph one or more such scenarios can be generated and selected either automatically or by a user. In some implementations, once the recommended component deployments are produced as scenarios, manual adjustment may be performed if changes are necessary based on additional factors and operational specifics of each of the components. For example, adjustment may be beneficial in a situation where two microservices that have a very different functions, despite one service being invoked very often by the other and therefore having a span between them assigned a high weight.

Thus, the selected scenarios may include indication of which of the various components of an application should be jointly or separately deployed. Similarly, the scenarios can include indications of whether previously separately deployed components should be merged and deployed together and whether previously merged or jointly deployed components should be separated and deployed apart from each other. In some implementations, the guiding principle may be that the higher the proportion of traces that traverse a span between any two given components, the higher the likelihood that the operation of the application would be more efficient if the components were deployed together. Conversely, according to the same principle. The lower the proportion of traces that traverse a span between any two given components, the higher the likelihood that the operation of the application would be more efficient if the components were deployed separately.

Accordingly, the constituent components of the application can then be taken and deployed or redeployed according to the recommendation included in the desired scenario. As noted earlier, deployment of an application component may include the hosting of a component at a particular physical location and executing/running the component on a particular set of computing resources either together with or separately from other components of the same application. These and other features of the implementations can be better understood with reference to FIGS. 1-6 described below. To provide context for the various implementations and the determination of a distributed system topology for application component deployment, an example network architecture is initially described below.

Figure 1:
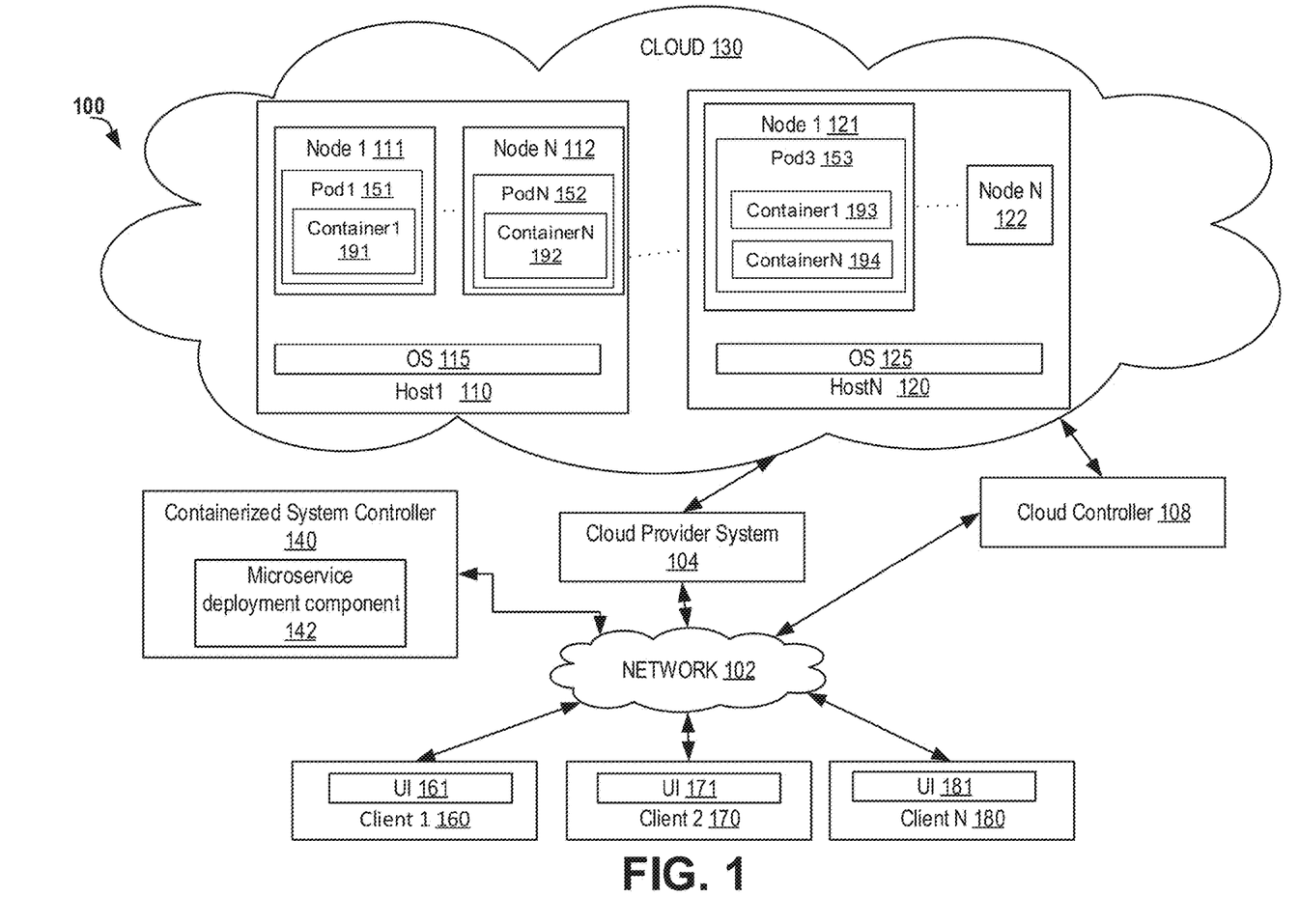
FIG. 1 depicts a block diagram of an example network architecture, in accordance with one or more implementations of the disclosure.

FIG. 1 is a block diagram of a network architecture 100 in which implementations of the disclosure may operate. In some implementations, the network architecture 100 may be used in a containerized computing services platform. A containerized computing services platform can include a Platform-as-a-Service (PaaS) system or a Function-as-a-Service (FaaS) system. PaaS and FaaS systems can provide resources and services (e.g., microservices) for the development and execution of applications owned or managed by multiple users. Such systems can provide a platform and environment that allow users to build applications and services in a clustered computing environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the distributed computing system 100 may include a cloud-computing environment 130 (also referred to herein as a cloud) that includes computing nodes 111, 112, 121, 122 to execute applications and/or processes (e.g., services, microservices, etc.) associated with the applications. A "computing node" providing computing functionality may provide the execution environment for an application of the PaaS or FaaS system. In some implementations, the "computing node" may refer to a container or virtual machine (VM) that is hosted on a physical machine, such as host 1 110 through host N 120, implemented as part of the cloud 130. In some implementations, the host machines 110, 120 can be located in a data center. For example, both computing nodes 111 and 112 can be hosted on the same physical machine 110 in cloud 130 provided by cloud provider 104. In other implementations, different processes of the same application can be deployed to computing node N 112 and computing node 1 121 with each node being hosted by different physical machines 110 and 120 and respectively located in disparate geographic locations and within different local networks. In some implementations, an environment other than a container or VM may be used to execute functionality of the PaaS or FaaS system applications. When computing nodes 111, 112, 121, 122 are implemented as containers or VMs, they may each be executed by respective operating systems (OSs) 115, 125 on each respective host machine 110, 120.

In some implementations, the host machines 110, 120 may be located in the same data center while in other implementations, the host machines 110, 120 can be located in different data centers in remote physical locations from each other. Users can interact with applications or their constituent services and microservices executing on the cloud-based computing nodes 111, 112, 121, 122 using client computer systems, such as clients 160, 170 and 180, via corresponding user interfaces (e.g., web browser applications) 161, 171 and 181. In other implementations, the applications or their constituent components may be hosted directly on hosts 1 through N 110, 120 without the use of VMs (e.g., a "bare metal" implementation), and in such an implementation, the hosts themselves are referred to as "computing nodes".

Clients 160, 170, and 180 can be connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from the containerized system controller 140. In response to these commands, the cloud controller 108 can provide data associated with different applications to the cloud provider system 104. This data may be used for the execution of application components in a containerized computing services platform managed by the containerized system controller 140.

In one implementation, the data is used for execution of containers 191, 192, 193, 194 in one or more pods 151, 152, 153. The pods 151, 152, 153 can be a group of one or more containers that are deployed together on the same node 111, 112, 121, and can be the smallest compute unit that can be defined, deployed, and managed in the containerized computing service environment. For example, each microservice of the application may be executed in one of the containers 191, 192, 193, 194. Each pod 151, 152, 153 can be allocated its own internal IP address, with containers 191, 192, 193, 194 in pods 151, 152, 153 being able to share local storage and networking. Pods 151, 152, 153 can have a lifecycle that is pre-defined and can run on a node 111, 112, 121 until the pod's containers exit or they are removed for some other reason.

The containers 191, 192, 193, 194 can include application component images built from pre-existing application components and source code of users managing the application. An image may refer to data representing executables and files of the application component used to deploy functionality for a runtime instance of the application. A container 191, 192, 193, 194 can be a secure process space on the nodes 111, 112, 121 to execute functionality of an application or an application component. In some implementations, a container 191, 192, 193, 194 can be established at the nodes 111, 112, 121 and 122 with access to certain resources of the underlying node, including memory and storage.

In some implementations, the containerized system controller 140 may implement a microservice deployment component 142. The microservice deployment component 142 may provide visualizations of a distributed microservice deployment network topology implemented by containerized system controller 140 via nodes 111, 112, 121. For example, computing nodes 111, 112, 121 may be utilized to implement a microservice deployment network topology that deploys microservices via pods 151, 152, 153. Pods 151, 152, 153 can provide the workload of the microservices of the microservice network, as discussed herein. The microservice deployment component 142 may provide the visualizations of the microservice network topology to one or more requesting users at client devices 160, 170, 180. For example, in response to a request for a particular microservice network topology graph type, microservice deployment component 142 may transmit generated visualization data for the requested microservice network graph type to client device 160, 170, 180 to be rendered via a GUI for display to the requesting user using, for example, browser 161, 171, 181 at client device 160, 170, 180.

As discussed above, a microservice network can include components such as workloads, application, services, and microservices. The components of the microservice network can be represented in a graph of directed diagram nodes with diagram nodes in the graph representing the microservices of the microservice network. Such a graph may be referred to herein as a microservice network graph or a "graph". A microservice network graph may represent each workload, application, service, or microservice as a node in the microservice network graph. Diagram nodes in the microservice network graph may be connected to one another based on which components of the microservice network are communicating with one another. For example, if component A sends a request to component B, the microservice network graph depicts the two diagram nodes A and B connected via an edge.

In some implementations, microservice deployment component 142 can receive traces of requests originating at a component of an application deployed on one or more devices of the distributed computing system 100. A trace of a request can be the path of a request generated by a component of an application as it traverses the network of application components. Microservice deployment component 142 may also perform the traces and track the path of the requests within the microservice network. In some implementations, the microservice deployment component 142 can perform the traces at regularly scheduled time intervals or for some fraction of the requests that are generated by a component of the application in the microservices network. The traces can be performed over a pre-determined period of time or continuously during the operation of the application. For example, the microservice deployment component 142 can trace every request generated by every root component of an application through each component of the application that it traverses. In one implementation, the microservice deployment component 142 can assign a unique ID to each request and a unique ID to each step in a trace to encode contextual information. Further, the microservice deployment component 142 can propagate the encoded context along with the request from one service to the next as the request makes its way through the application environment. Thus, the microservice deployment component 142 can collect the data from all of the traces for further processing and analysis. Having performed the traces, the microservice deployment component 142 can determine the number of times each span between application components is traversed by a trace and associate each span with a corresponding weight value. In some implementations, the microservice deployment component 142 can assign a weight to a span that is indicative of the number of times the span is traversed by a trace. In other implementations, the microservice deployment component 142 can assign a weight to a span that is reflective of a proportion of traces that traverse the span out of the total number of traces performed.

Microservice deployment component 142 may provide various visualizations of the microservice network topology based on the metadata of the microservices (i.e., data descriptive of the interconnections of the microservices along with their related requests and responses to requests) of the microservice network. The metadata may be stored in a data store maintained by containerized system controller 140 or maintained separately from containerized system controller 140.

Microservice deployment component 142 may utilize microservice metadata to generate several different microservice network graph types depicting various microservice network topologies that represent the microservice network implemented by containerized system controller 140.

In one implementation, microservice deployment component 142 may receive a user request for a particular type of microservice network graph type for a microservice network topology. Based on the requested microservice network graph type, microservice deployment component 142 may access the microservice data store to identify the microservice network diagram nodes and the connections between such diagram nodes in order to generate the requested microservice network graph type for the microservice network topology.

In some implementations, microservice deployment component 142 can generate a microservice deployment topology that reflects how microservices can be deployed in a distributed computing system 100. The deployment topology may be a visual graphical representation of a sub-set of the application's microservices being deployed jointly (e.g., on the same set of computing resources) and of a sub-set of the application's microservices being deployed separately (i.e., on different sets of computing resources). The microservice deployment component 142 can generate (e.g., by visual representation on a user interface 161, 171, 181) one or more deployment scenarios where a different microservice deployment topology is included in each scenario. The microservice deployment component 142 can recommend the scenarios to a user. Each of the scenarios can depict or reflect various combinations of application components (e.g., microservices) being merged or split from each other for deployment. In some implementations, merged microservices in a scenario can indicate that the merged microservices should be deployed together on the same set of computing resources while split microservices in the scenario may indicate that the separate microservices can be deployed independently on different sets of computing resources.

The microservice deployment component 142 can, therefore, select a microservice deployment scenario and a corresponding microservice network topology based on the respective weights of each of the spans between the components of the application. This selection can include determining whether the weight of a given span satisfies a threshold criterion. The threshold criterion may be a threshold weight value. Accordingly, a weight satisfying the criterion can be a weight that exceeds a threshold weight value while a weight failing to satisfy the threshold criterion can be weight that is less than a threshold weight value. In some implementations, components having a span assigned a weight value that is higher than a threshold value can be merged and components having a span assigned a weight value that is lower than the threshold value can be split.

Therefore, when generating scenarios, the microservice deployment component 142 can merge components together for them to be deployed jointly and can split components for them to be deployed separately based on the weight values of the spans between the components. Similarly, when selecting scenarios, the microservice deployment component 142 can select scenarios where components are either merged or split based on the weight values of the spans between them. Consequently, the microservice deployment component 142 can then deploy the components (e.g., microservices) of the application in the respective containers 191, 192, 193, 194, of the respective pods 151, 152, 153, computing nodes 111, 112, 121, and hosts 110, 120 of the distributed computing system 100 according to the selected deployment scenario.

Figure 2:
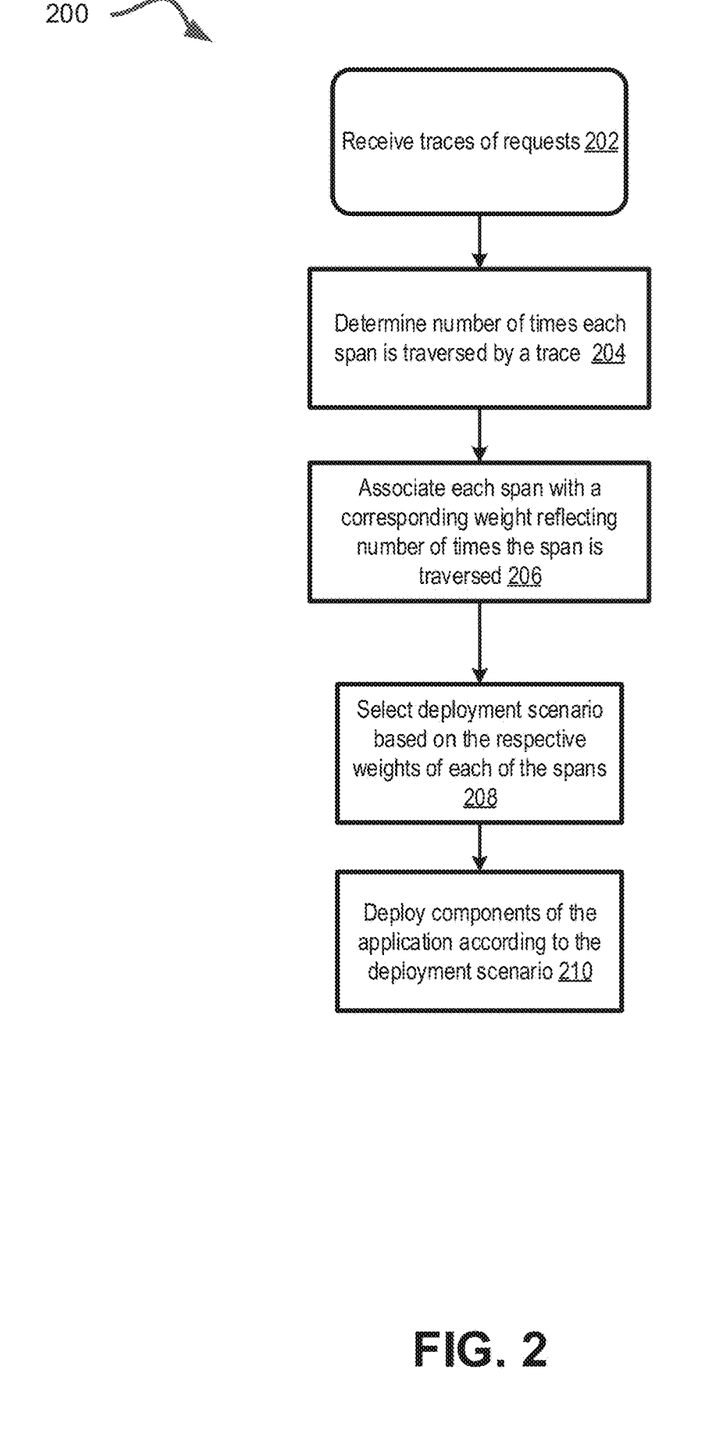
FIG. 2 depicts a flow diagram of an example method for determining a system topology for an application deployment, in accordance with some implementations.

In some embodiments, the microservice deployment component 142 can include one or more components described in connection with FIG. 6 and can implement one or more methods described in connection with FIGS. 2-3. While various implementations are described in terms of the environment described above, the functionality may be implemented in a variety of other environments including a single, monolithic computer system, as well as various other combinations of computer systems or similar devices connected in various ways. For example, the microservice deployment component 142 may be running on a computing node, such as computing nodes 111, 112, 121, 122, of the system 100 hosted by cloud 130, or may execute external to cloud 130 on a separate server device. In some implementations, the microservice deployment component 142 may include more components than what is shown that operate in conjunction with the PaaS or FaaS system of network 100.

The procedure for determining a microservice application deployment topology is described with reference to FIG. 2. FIG. 2 depicts a flow diagram of an example method 200 for determining a system topology for an application deployment, in accordance with some implementations. In some implementations, at block 202, the processing logic can receive one or more traces of requests within an application having one or more components (e.g., microservices). The traces can begin at a component that originated a request and track a path through the components of the application across one or more spans between the components. For example, the processing logic can trace every request generated by every root component of an application through each component of the application that it traverses. In one implementation, the processing logic can assign a unique ID to each request and to each step in a trace to encode contextual information. Further, the processing logic can propagate the encoded context along with the request from one service to the next as the request makes its way through the application environment. Thus, the processing logic can collect the data from all of the traces for further processing and analysis.

After the traces of the requests are performed and received at block 202, the processing logic can, at block 204, determine the number of times that each span between the components of the application is traversed by a trace. In some implementations, a span between any two given components of an application can be traversed by one or more traces as the traces of requests are performed in the application. Thus, the processing logic can count the number of times that each span between application components is traversed by a trace.

Accordingly, at block 206, the processing logic can associate each span with a corresponding weight reflecting the number of times that the span is traversed. In some implementations, the processing logic can assign a weight to a span such that the weight indicates the raw number of times that the span was traversed. In other implementations, the processing logic can assign a weight to a span that represents a proportion of the total traces that were performed in the application that happened to traverse the span.

Consequently, the processing logic can, at block 208, select a deployment scenario based on the respective weights of each of the spans. Each deployment scenario can include different application component deployment combinations where the components are either merged or split based on the weights given to the spans between them. The deployment scenario may be a visual graphical representation of a topology of the distributed components of an application showing a sub-set of the application's microservices being deployed jointly (e.g., on the same set of computing resources) and of a sub-set of the application's microservices being deployed separately (i.e., on different sets of computing resources). In some implementations, at block 210, the processing logic can deploy the components of the application according to the deployment scenario. This can include deploying components that are merged in the scenario on the same set of computing resources while deploying components that are split on separate sets of computing resources. Another implementation can include additional operations being performed by the processing logic. One such example implementation is described below with reference to FIG. 3.

Figure 3:
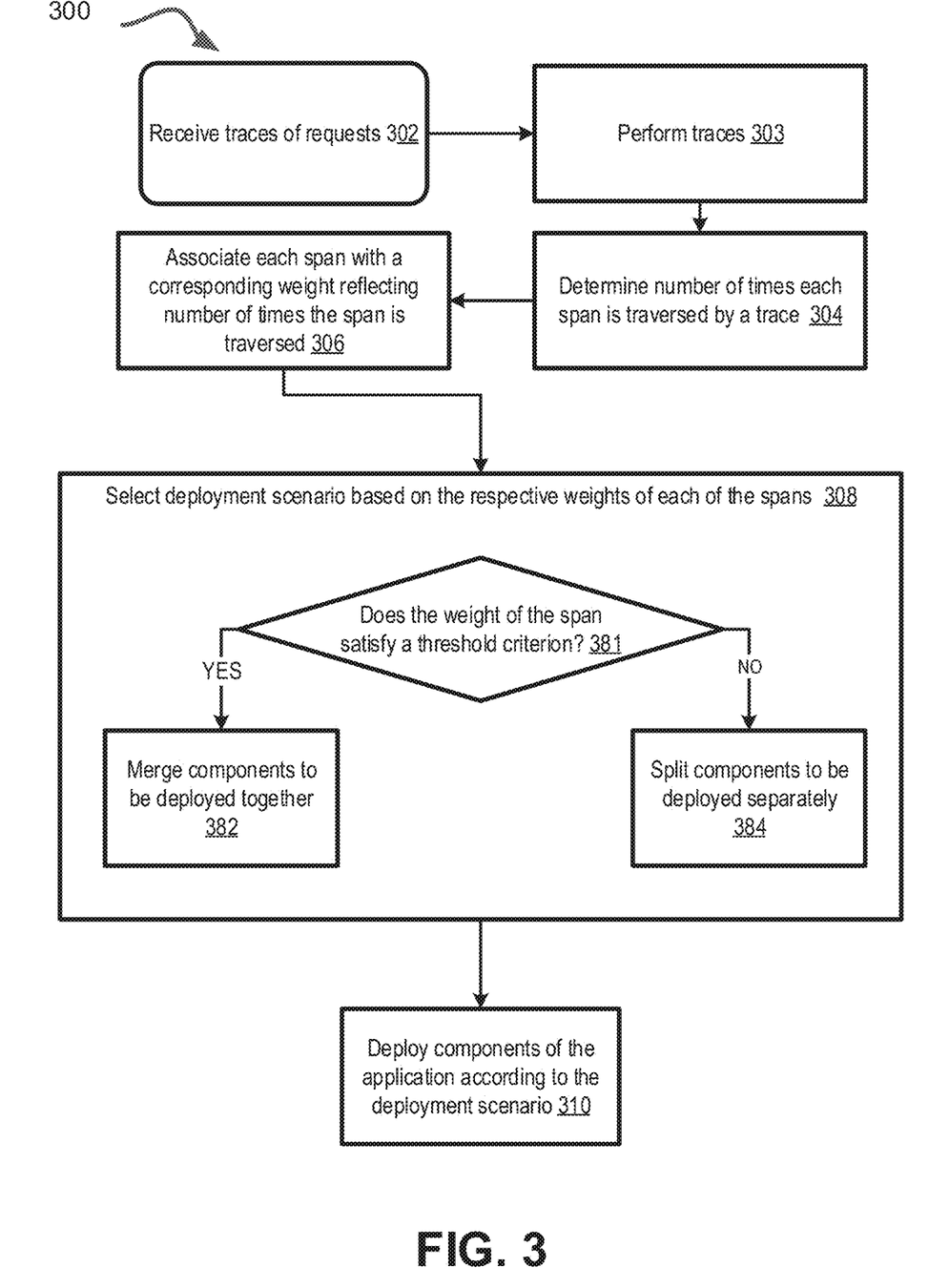
FIG. 3 depicts a flow diagram of an example method for determining a system topology for an application deployment, in accordance with some implementations.

FIG. 3 depicts a flow diagram of an example method 300 for determining a system topology for an application deployment, in accordance with some implementations. In these implementations, the processing logic can, at block 302, receive traces of requests originating at a component of an application deployed on one or more devices of the distributed computing system 100. A trace of a request can be the path of a request generated by a component of an application as it traverses the network of application components. The processing logic may, at block 303, also perform the traces and track the path of the requests within the microservice network. In some implementations, the processing logic can, at block 303, perform the traces at regularly scheduled time intervals for all requests or for some fraction of the requests that are generated by a component of the application in the microservices network. The traces can be performed over a pre-determined period of time or continuously during the operation of the application.

Having performed the traces, the processing logic can, at block 304, determine the number of times each span between application components is traversed by a trace. The processing logic can, at block 304, count the number of times a span is traversed by a trace and, at block 306, associate the span with a weight value. Associating a weight value with a span can include assigning the weight value for the span in the metadata of the application components serving as the endpoints of the span. In some implementations, the processing logic can, at block 306, assign a weight to a span that is indicative of the number of times the span is traversed by a trace or reflective of a proportion of traces that traverse the span out of the total number of traces performed in the application.

The processing logic can generate visualization of the microservice network topology based on the metadata of the microservices (i.e., data descriptive of the interconnections of the microservices along with their related requests and responses to requests) of the microservice network. The processing logic may utilize microservice metadata to generate several different microservice network graph types depicting various microservice network topologies that represent the microservice network implemented by containerized system controller 140.

In one implementation, the processing logic may, at block 308, receive a user request for a particular type of microservice network graph type for a microservice network topology. Based on the requested microservice network graph type, the processing logic may access the microservice data store to identify the microservice network diagram nodes and the connections between such diagram nodes in order to generate the requested microservice network graph type for the microservice network topology.

In some implementations, the processing logic can generate a microservice deployment topology that reflects how microservices can be deployed in a distributed computing system 100. The deployment topology may be a visual graphical representation of a sub-set of the application's microservices being deployed jointly (e.g., on the same set of computing resources) and of a sub-set of the application's microservices being deployed separately (i.e., on different sets of computing resources). The processing logic can, at block 308, generate (e.g., by visual representation on a user interface 161, 171, 181) one or more deployment scenarios where a different microservice deployment topology is included in each scenario. The processing logic can, at block 208, recommend the scenarios to a user. Each of the scenarios can depict or reflect various combinations of application components (e.g., microservices) being merged or split from each other for deployment based on the weight of the spans between them. In some implementations, merged microservices in a scenario can indicate that the merged microservices should be deployed together on the same set of computing resources while split microservices in the scenario may indicate that the separate microservices can be deployed independently on different sets of computing resources.

The processing logic can, therefore, at block 208, select a microservice deployment scenario and a corresponding microservice network topology based on the respective weights of each of the spans between the components of the application. This selection can include determining, at block 381, whether the weight of a given span satisfies a threshold criterion. The threshold criterion may be a threshold weight value. Accordingly, a weight satisfying the criterion can be a weight that exceeds a threshold weight value while a weight failing to satisfy the threshold weight criterion can be weight that is less than a threshold weight value. Conversely, a weight satisfying the criterion can be a weight that is less than a threshold weight value while a weight failing to satisfy the threshold criterion can be weight that exceeds a threshold weight value. In some implementations, the processing logic can, at block 382, merge components having a span assigned a weight value that is higher than a threshold value and, at block 384, split components having a span assigned a weight value that is lower than the threshold value.

Therefore, when generating scenarios, at block 308, the processing logic can merge components together, at block 382, for them to be deployed jointly, and can split components, at block 384, for them to be deployed separately based on the weight values of the spans between the components. Similarly, when selecting scenarios, the processing logic, can, at block 308, select scenarios where components are either merged or split, at block 382 and 384 respectively, based on the weight values of the spans between them. Consequently, the processing logic can, at block 310, then deploy the components (e.g., microservices) of the application in the respective containers 191, 192, 193, 194, of the respective pods 151, 152, 153, computing nodes 111, 112, 121, and hosts 110, 120 of the distributed computing system 100 according to the selected deployment scenario.

Figure 4A:
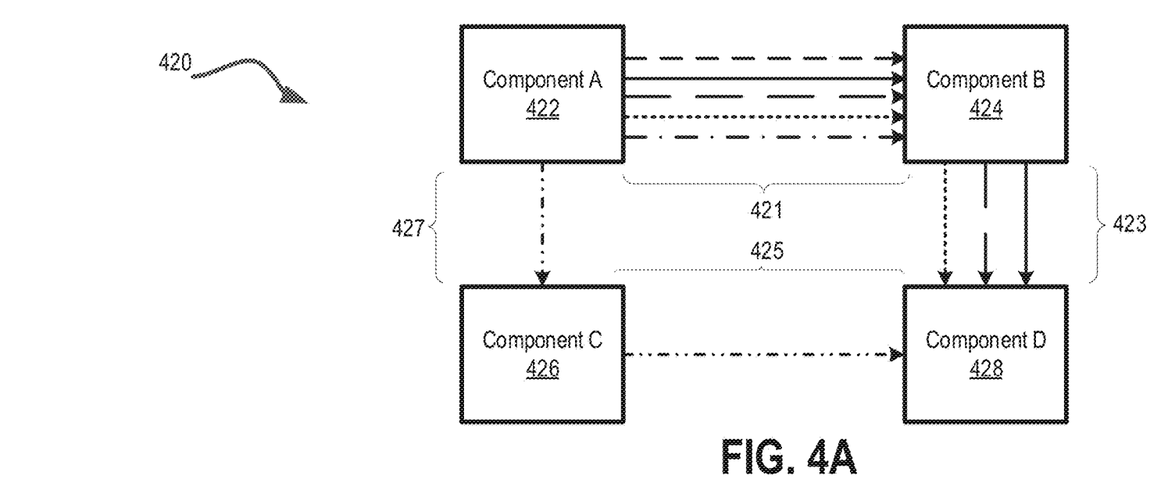
FIG. 4A illustrates a block diagram of an example application, in accordance with some implementations.
Figure 4B:
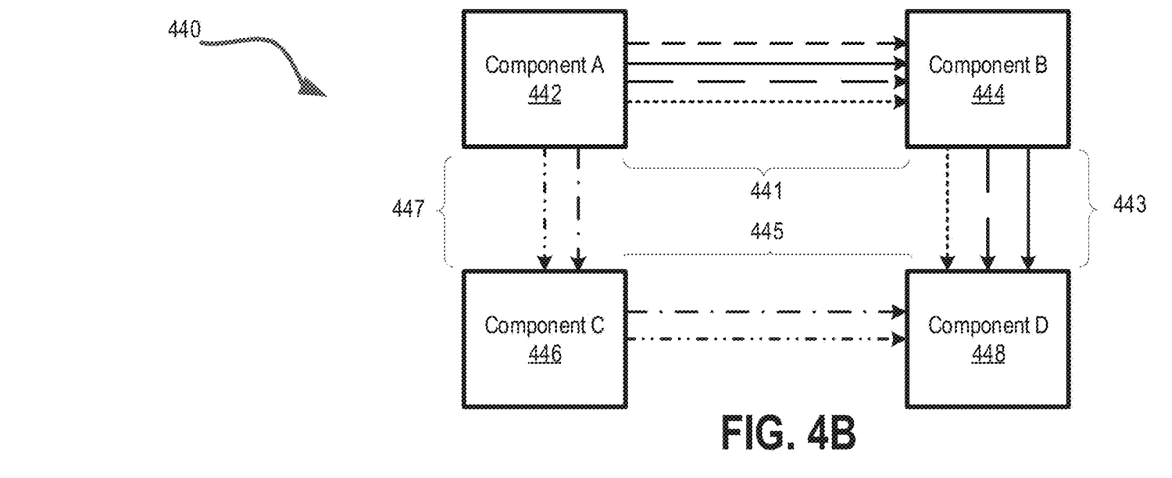
FIG. 4B illustrates a block diagram of an example application, in accordance with some implementations.

Examples of application component network graphs showing multiple traces can be understood with reference to FIGS. 4A-4B. For example, FIG. 4A illustrates a block diagram of an example application 420, in accordance with some implementations. In one implementation, an application 420 can include multiple components, specifically, component A 422, component B 424, component C 426, and component D 428. The illustrated graph also shows traces of requests that have occurred within the application 420.

Thus, out of a total number of 6 traces, 5 traces traversed the span 421 between component A 422 and component B 426. In this example application, 3 traces traversed the span 423 between component B 424 and component D 428, and one trace traversed each span 427, 425 respectively between component A 422 and component C 426, and between component C 426 and component D 428. Accordingly, the span 421 can be associated with a weight value of 0.83 and the span 423 can be associated with a weight of 0.5. Analogously, the span 427 and the span 425 can each be associated with a weight of 0.17. In this example the weights are reflective of a proportion of the total number of traces performed that traversed the given span.

In one implementation, if the merge factor (i.e., the threshold criterion value) is 0.75, then a scenario that merges some of the components and splits some of them can be selected. For example, component A 422 and component B 424 can be merged in the selected deployment scenario because the span 421 has a weight of 0.83 which is higher than the merge factor 0.75. However, component C 426 and component D 428 can be deployed separately because none of the spans of which they are an endpoint have a weight value higher than 0.75. However, if the merge factor was 0.4, then any combination of component A 422, component B 424, and component D 428 could be merged to be deployed together and component C could be split off to be deployed separately.

A different set of traces can occur in a different application. For example, FIG. 4B illustrates a block diagram of an example application 440, in accordance with some implementations. In one implementation, an application 440 can include multiple components, specifically, component A 442, component B 444, component C 446, and component D 448. The illustrated example also shows traces of requests that have occurred within the application 440.

Thus, out of a total number of 6 traces, 4 traces traversed the span 441 between component A 442 and component B 446. In this example application, 3 traces traversed the span 443 between component B 444 and component D 448, and two traces traversed each span 447, 445 respectively between component A 442 and component C 446, and between component C 446 and component D 448. Accordingly, the span 441 can be associated with a weight value of 0.67 and the span 443 can be associated with a weight of 0.5. Analogously, the span 447 and the span 445 can each be associated with a weight of 0.33. In this example graph the weights are also reflective of a proportion of the total number of traces performed that traversed the given span.

In one implementation, if the merge factor (i.e., the threshold criterion value) is 0.75 as in the previous example, then a scenario that splits all of the components can be selected. Because all of the spans have weight values that are below the threshold merge factor 0.75, all of them can be deployed independently. However, if the merge factor is 0.5, component A 442 and component B 444 can be merged in the selected deployment scenario as can component B 444 and Component D 448 because the span 441 and the span 443 have a weight which is higher than the merge factor 0.5. Accordingly, component C 446 and component D 448 can be deployed separately because none of the spans, 447, 445, of which they are an endpoint have a weight value higher than 0.5. In this manner, scenarios can be generated and selected such that the constituent components (e.g., microservices) of an application are either merged or split based on the weights assigned to the spans between them.

Figure 5:
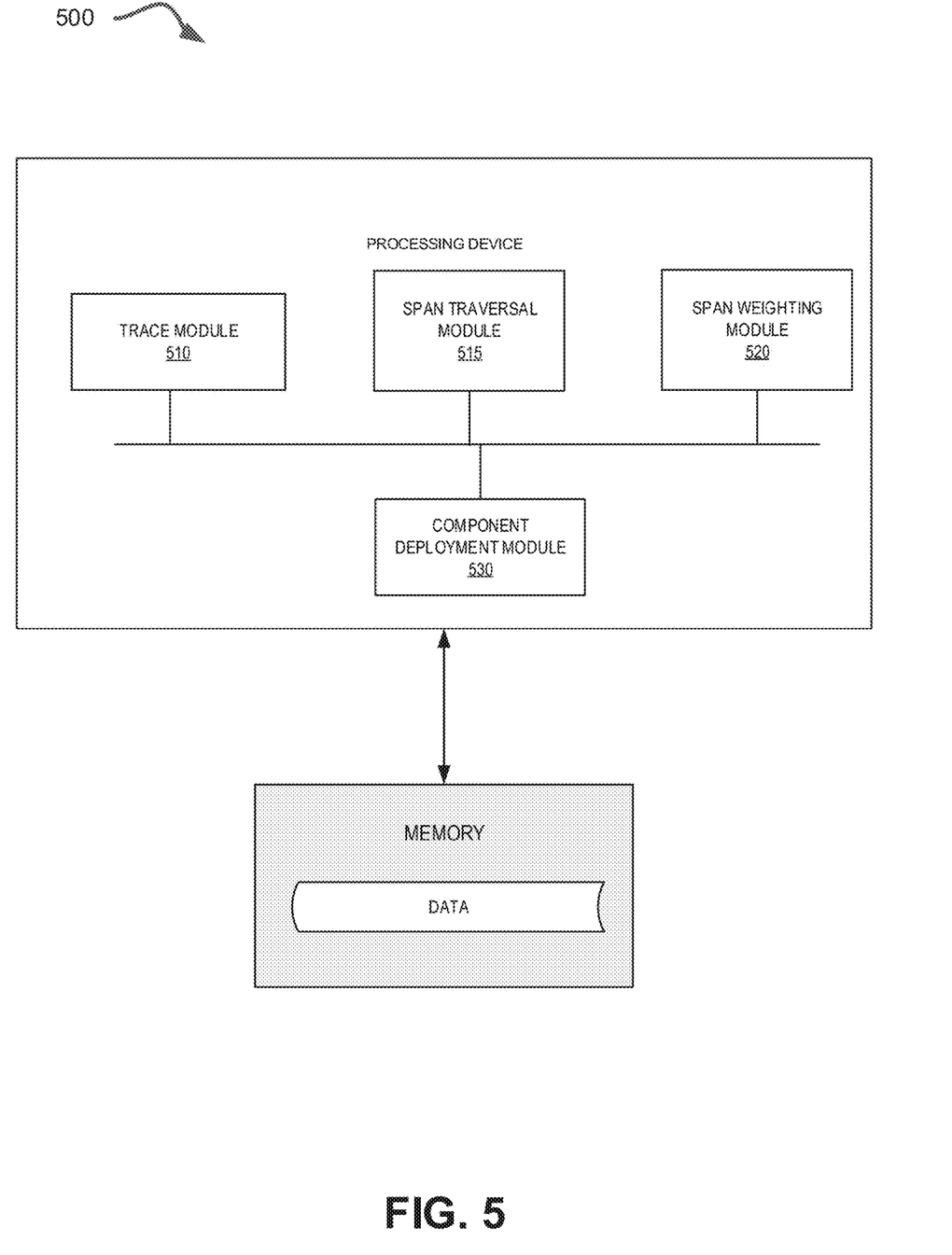
FIG. 5 depicts a block diagram of an example computer system in accordance with one or more implementations of the present disclosure.

FIG. 5 depicts a block diagram of a computer system 500 operating in accordance with one or more aspects of the present disclosure. Computer system 500 may be the same or similar to host 110, client 160, or orchestration platform 140 of FIG. 1, and may include one or more processors and one or more memory devices. In the example shown, computer system 500 may include a trace module 510, a span traversal module 515, a span weighting module 520, and a component deployment module 530.

The trace module 510 may enable a processor to receive and perform traces of requests occurring within an application (i.e., traces of requests passing through the various components of an application). The component span traversal module 615 may enable the processor to calculate or otherwise quantify the number of traces that traverse each span between the components of an application.

The span weighting module 620 may enable the processor to associate each span with a weight (e.g., by assigning a weight reflective of a number of traces that traversed the span). The weight may be a raw number of traces that traversed the span or may be a value reflective of a proportion of traces that traversed the span out of the total number of traces performed in the application. Component deployment module 630 can enable the processor to deploy applications according to scenarios including application components that are merged and split based on the weights of the spans between them.

Figure 6:
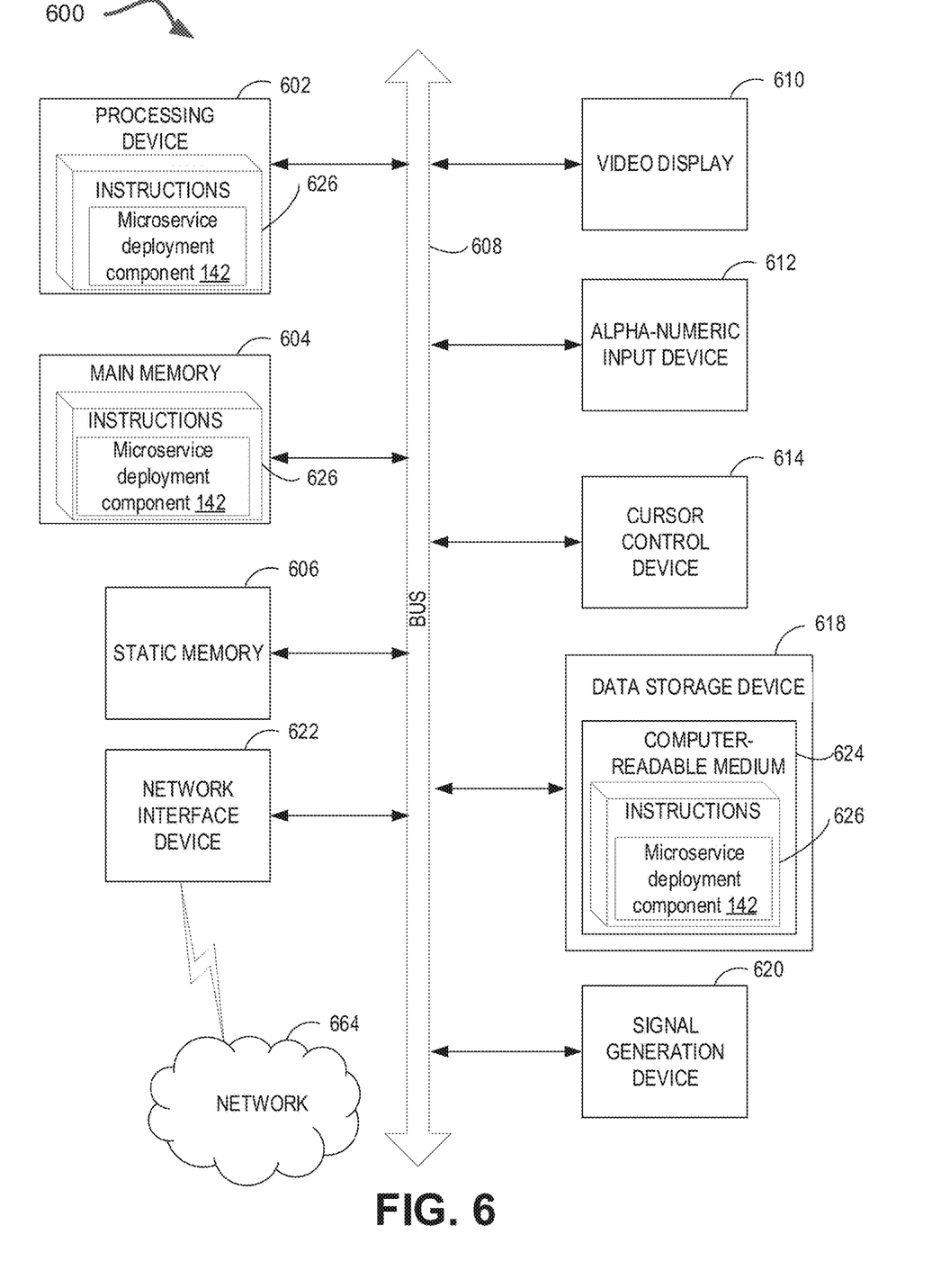
FIG. 6 depicts a block diagram of an illustrative computing device operating in accordance with the implementations of the disclosure.

FIG. 6 depicts a block diagram of a computer system operating in accordance with one or more aspects of the disclosure. In various illustrative examples, computer system 600 may correspond to computer system 100 of FIG. 1. The computer system may be included within a data center that supports virtualization and distributed computing. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620. Data storage device 616 may include a non-transitory computer-readable storage medium 624 on which may store instructions 626 encoding any one or more of the methods or functions described herein (e.g., methods 200, 300), including instructions for implementing the microservice deployment component 142. Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner. In certain implementations, not all operations or sub-operations of the methods herein are required to be performed.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "identifying," "displaying," "obtaining," "creating," "generating," "mapping," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus.

Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
   receiving, by a processing device, a plurality of traces of requests within an application, wherein the application comprises a plurality of components;
   determining a number of times that each span between the components is traversed by a trace of the plurality of traces;
   associating each span with a corresponding weight reflecting the number of times that the span is traversed; and
   selecting a deployment scenario based on the respective weights of each of the spans.

2. The method of claim 1, further comprising deploying the components of the application according to the deployment scenario.

3. The method of claim 2, wherein deploying the components comprises: responsive to determining that the span between a pair of components satisfies a threshold criterion, merging the pair of components.

4. The method of claim 2, wherein deploying the components comprises: responsive to determining that the span between a pair of merged components does not satisfy a threshold criterion, splitting the merged components.

5. The method of claim 2, wherein each component of the plurality of components is a microservice of the application.

6. The method of claim 2, wherein deploying the components comprises grouping a set of components such that each component of the set has a span with a corresponding weight exceeding a threshold and deploying the components of the set at a same location.

7. The method of claim 2, wherein deploying the components comprises determining components having spans below a threshold value and deploying a first component of the determined components at a different location than a second component of the determined components.

8. A system comprising:
   a memory; and
   a processing device coupled to the memory, the processing device configured to:
      receive a plurality of traces of requests within an application, wherein the application comprises a plurality of components;
      determine a number of times that each span between the components is traversed by a trace of the plurality of traces;
      associate each span with a corresponding weight reflecting the number of times that the span is traversed; and
      select a deployment scenario based on the respective weights of each of the spans.

9. The system of claim 8, wherein the processing device is further configured to deploy the components of the application according to the deployment scenario.

10. The system of claim 9, wherein deploying the components comprises, responsive to determining that the span between a pair of components satisfies a threshold criterion, merging the pair of components.

11. The system of claim 9, wherein deploying the components comprises, responsive to determining that the span between a pair of merged components does not satisfy a threshold criterion, splitting the merged components.

12. The system of claim 9, wherein each component of the plurality of components is a microservice of the application.

13. The system of claim 9, wherein deploying the components comprises grouping a set of components such that each component of the set has a span with a corresponding weight exceeding a threshold and deploying the components of the set at a same location.

14. The system of claim 9, wherein deploying the components comprises determining components having spans below a threshold value and deploying a first component of the determined components at a different location than a second component of the determined components.

15. A non-transitory machine-readable storage medium including instructions that, when accessed by a processing device, cause the processing device to:
   receive a plurality of traces of requests within an application, wherein the application comprises a plurality of components;
   determine a number of times that each span between the components is traversed by a trace of the plurality of traces;
   associate each span with a corresponding weight reflecting the number of times that the span is traversed; and select a deployment scenario based on the respective weights of each of the spans.

16. The non-transitory machine-readable storage medium of claim 15, wherein the instructions further cause the processing device to deploy the components of the application according to the deployment scenario.

17. The non-transitory machine-readable storage medium of claim 16, wherein deploying the components comprises, responsive to determining that the span between a pair of components satisfies a threshold criterion, merging the pair of components.

18. The non-transitory machine-readable storage medium of claim 16, wherein deploying the components comprises responsive to determining that the span between a pair of merged components does not satisfy a threshold criterion, splitting the merged components.

19. The non-transitory machine-readable storage medium of claim 16, wherein deploying the components comprises grouping a set of components such that each component of the set has a span with a corresponding weight exceeding a threshold and deploying the components of the set at a same location.

20. The non-transitory machine-readable storage medium of claim 16, wherein deploying the components comprises identifying components having spans below a threshold value and deploying a first component of the identified components at a different location than a second component of the identified components.

* * * * *